A. W. HARRIS.
INTERMITTENT GEAR.
APPLICATION FILED NOV. 18, 1918.
1,331,760.
Patented Feb. 24, 1920.
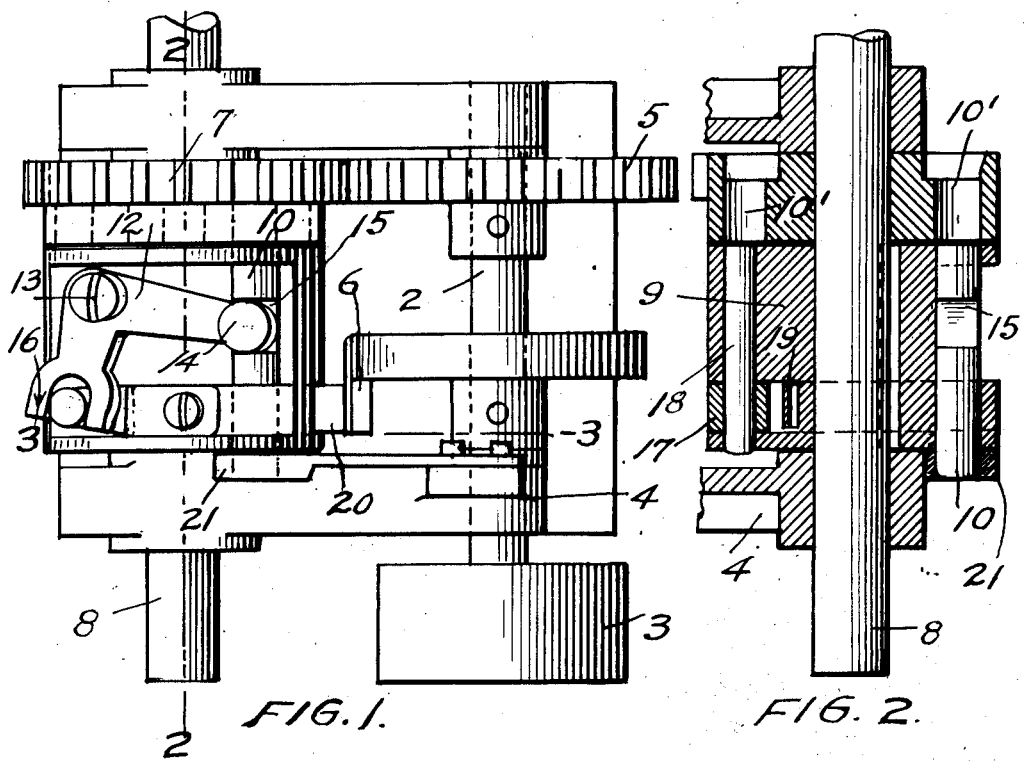
FIG. 1.
FIG. 2.
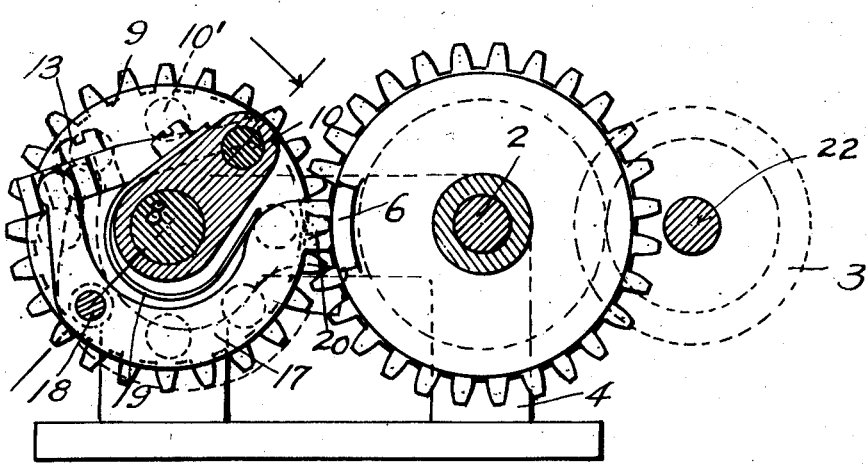
FIG. 3.
WITNESS
INVENTOR.
ARTHUR W. HARRIS.
BY
HIS ATTORNEYS.

A. W. HARRIS.
INTERMITTENT GEAR.
APPLICATION FILED NOV. 18, 1918.

WITNESS

INVENTOR
ARTHUR W. HARRIS.
BY
HIS ATTORNEYS.

A. W. HARRIS.
INTERMITTENT GEAR.
APPLICATION FILED NOV. 18, 1918.
1,331,760.
Patented Feb. 24, 1920.
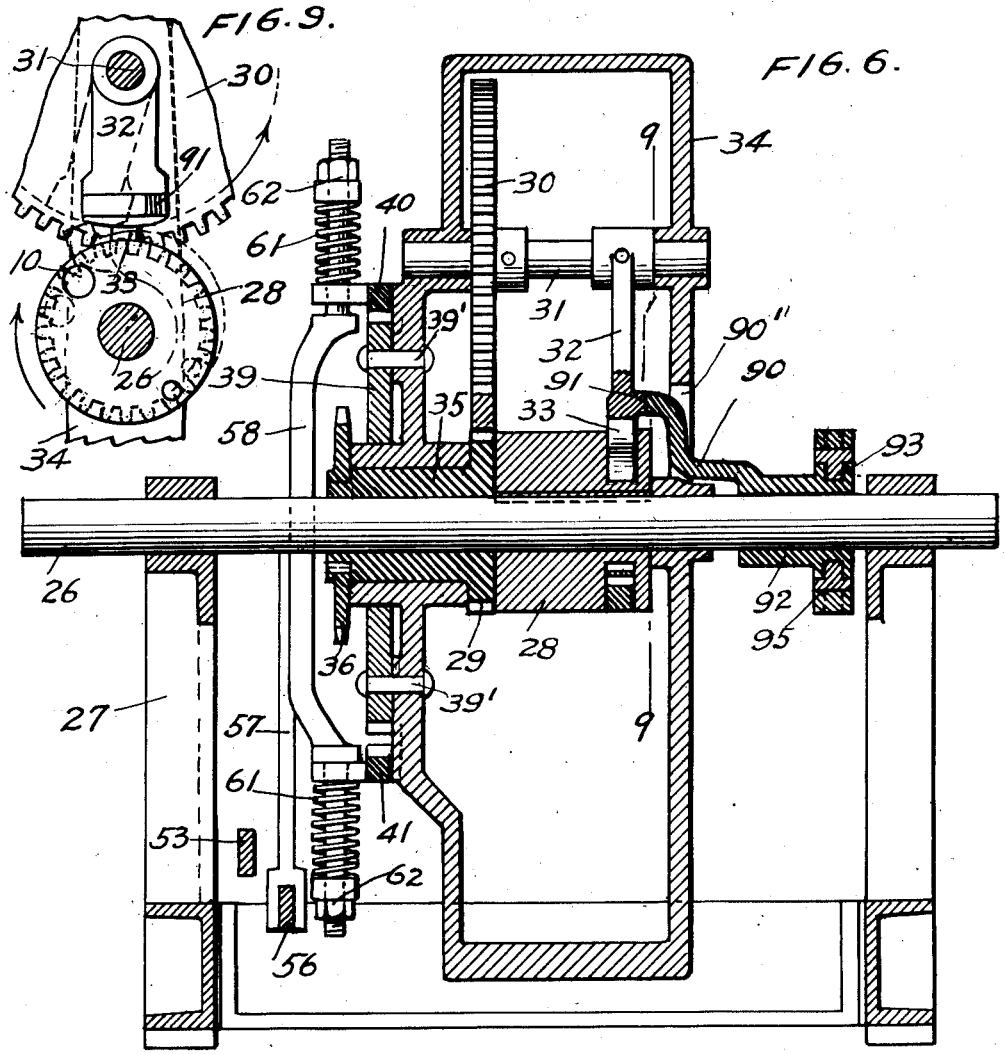
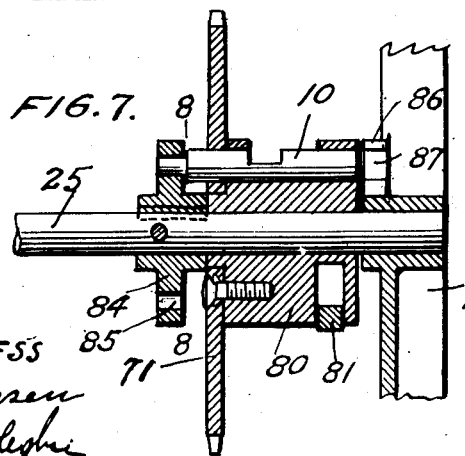
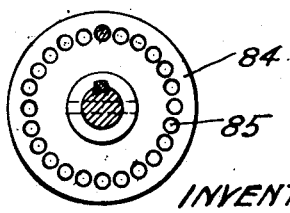
WITNESS
INVENTOR.
ARTHUR W. HARRIS.
BY
HIS ATTORNEYS.

A. W. HARRIS.
INTERMITTENT GEAR.
APPLICATION FILED NOV. 18, 1918.
1,331,760.
Patented Feb. 24, 1920.
6 SHEETS—SHEET 5.
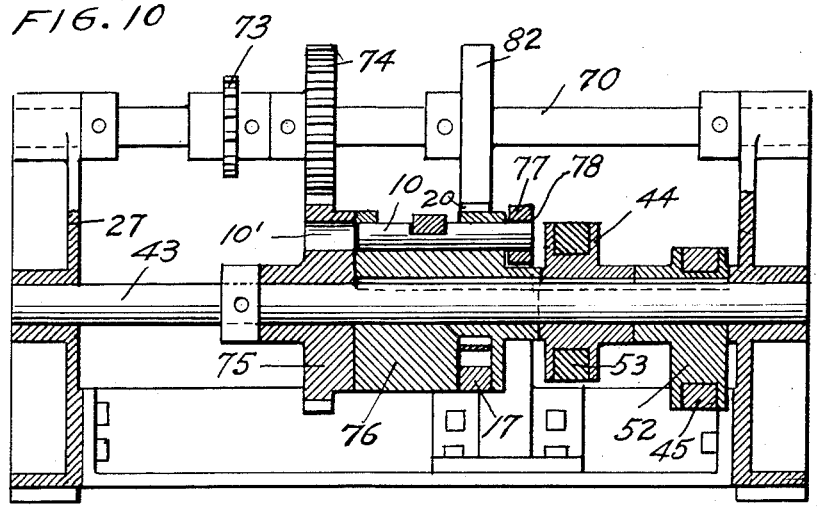
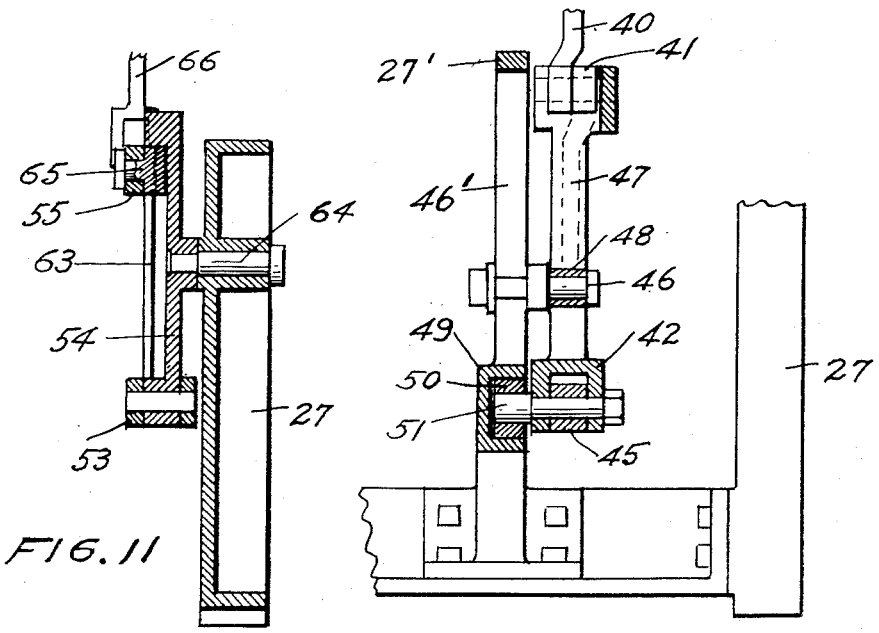
WITNESS
INVENTOR
ARTHUR W. HARRIS
BY Paul & Paul
HIS ATTORNEYS.

A. W. HARRIS.
INTERMITTENT GEAR.
APPLICATION FILED NOV. 18, 1918.
1,331,760.
Patented Feb. 24, 1920.
6 SHEETS—SHEET 6.
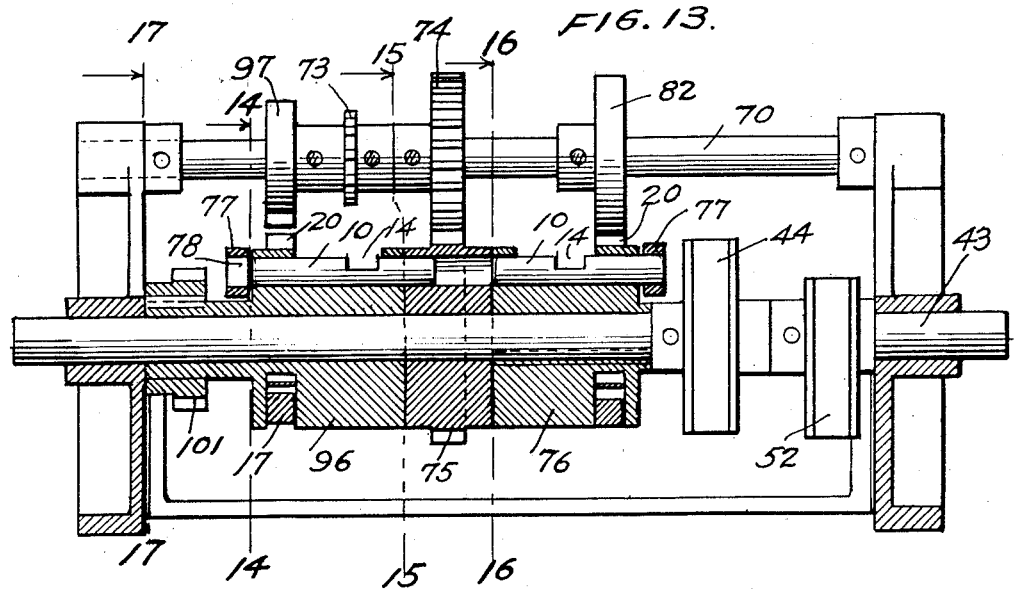
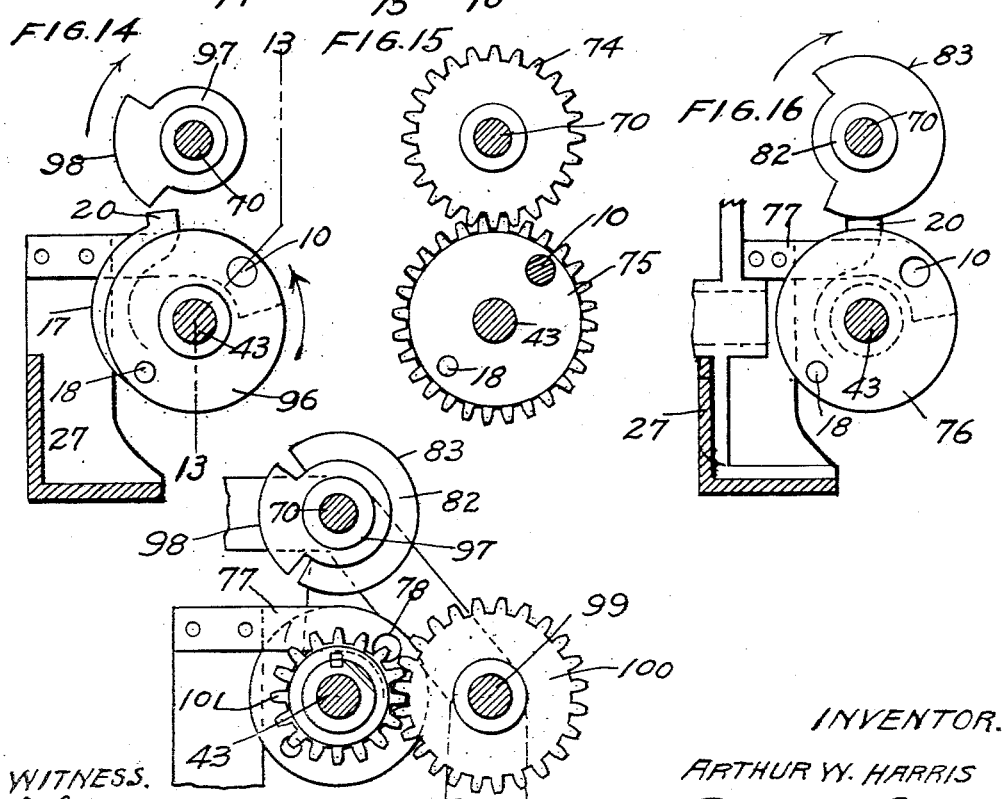
INVENTOR.
ARTHUR W. HARRIS
BY Paul & Paul
HIS ATTORNEYS.
WITNESS.
J. Jessen
M. R. DeLeghue

UNITED STATES PATENT OFFICE.

ARTHUR W. HARRIS, OF SLEEPY EYE, MINNESOTA.

INTERMITTENT GEAR.

1,331,760.  Specification of Letters Patent.  Patented Feb. 24, 1920.

Application filed November 18, 1918. Serial No. 263,000.

*To all whom it may concern:*

Be it known that I, ARTHUR W. HARRIS, a citizen of the United States, resident of Sleepy Eye, county of Brown, State of Minnesota, have invented certain new and useful Improvements in Intermittent Gears, of which the following is a specification.

My invention relates to a mechanism for changing the continuous rotary motion of a driving shaft or its equivalent into intermittent periods of motion and rest of a driven shaft and the object of my improvements are—

First, to provide a simple mechanical device that may be incorporated or attached to any machine for producing regular recurring motion and pauses with a wide range of relative duration;

Second, to provide means to obtain these motions and pauses in whole or fractional revolutions and adjustable in points of time and duration, and, Third, to provide positive and exact stops and starts and obviate all lost motion for the operating mechanism and to obtain these results in a device that may be easily and cheaply manufactured and assembled.

My invention is applicable to any automatic machinery as package making and filling machines, textile and similar machinery. It consists in general in one or more rotatable clutches and cams geared to work in unison at various ratios, the cams operating to disengage and hold the clutches out of engagement at varying periods of time.

Figure 4:
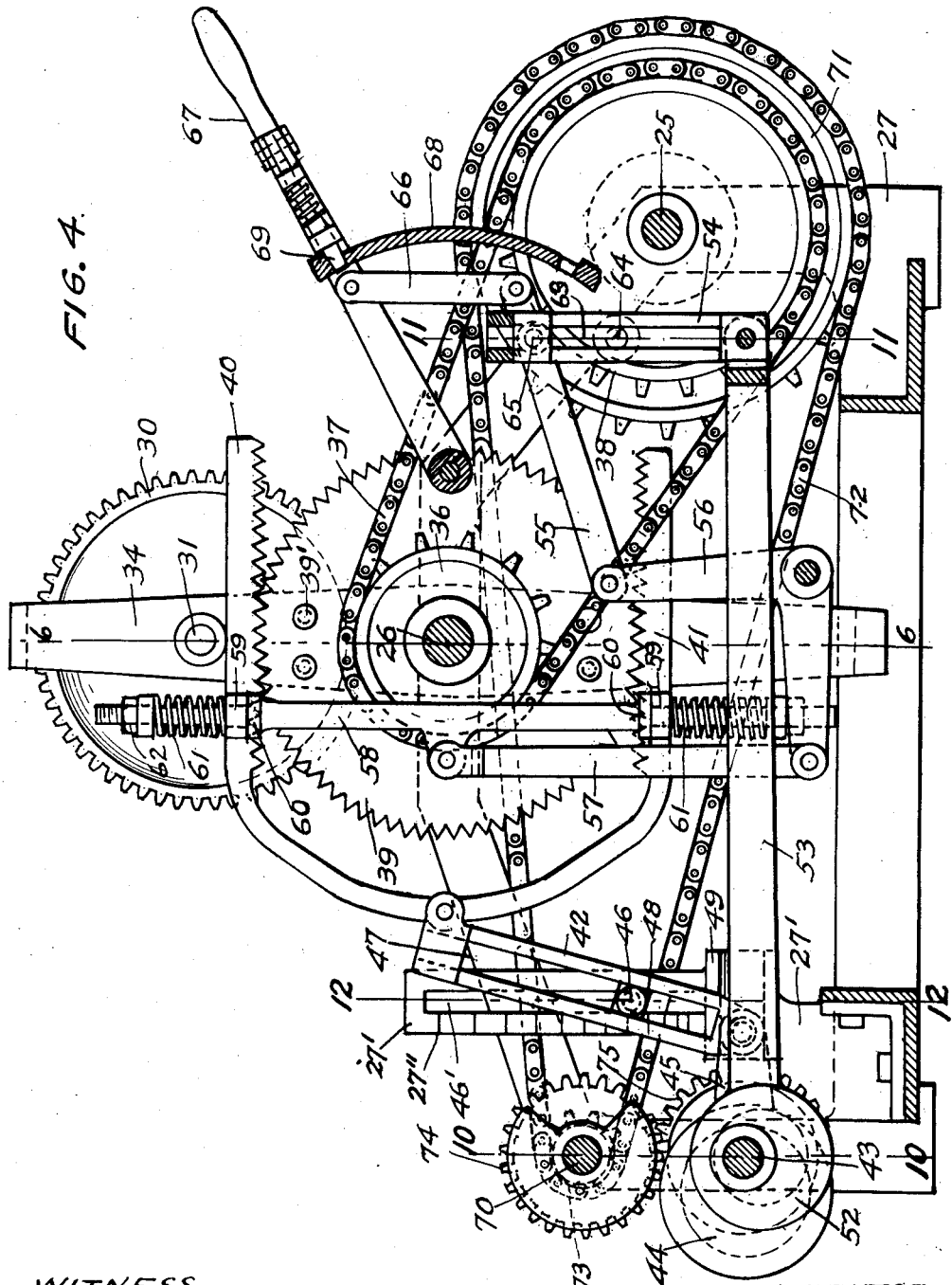
Figure 5:
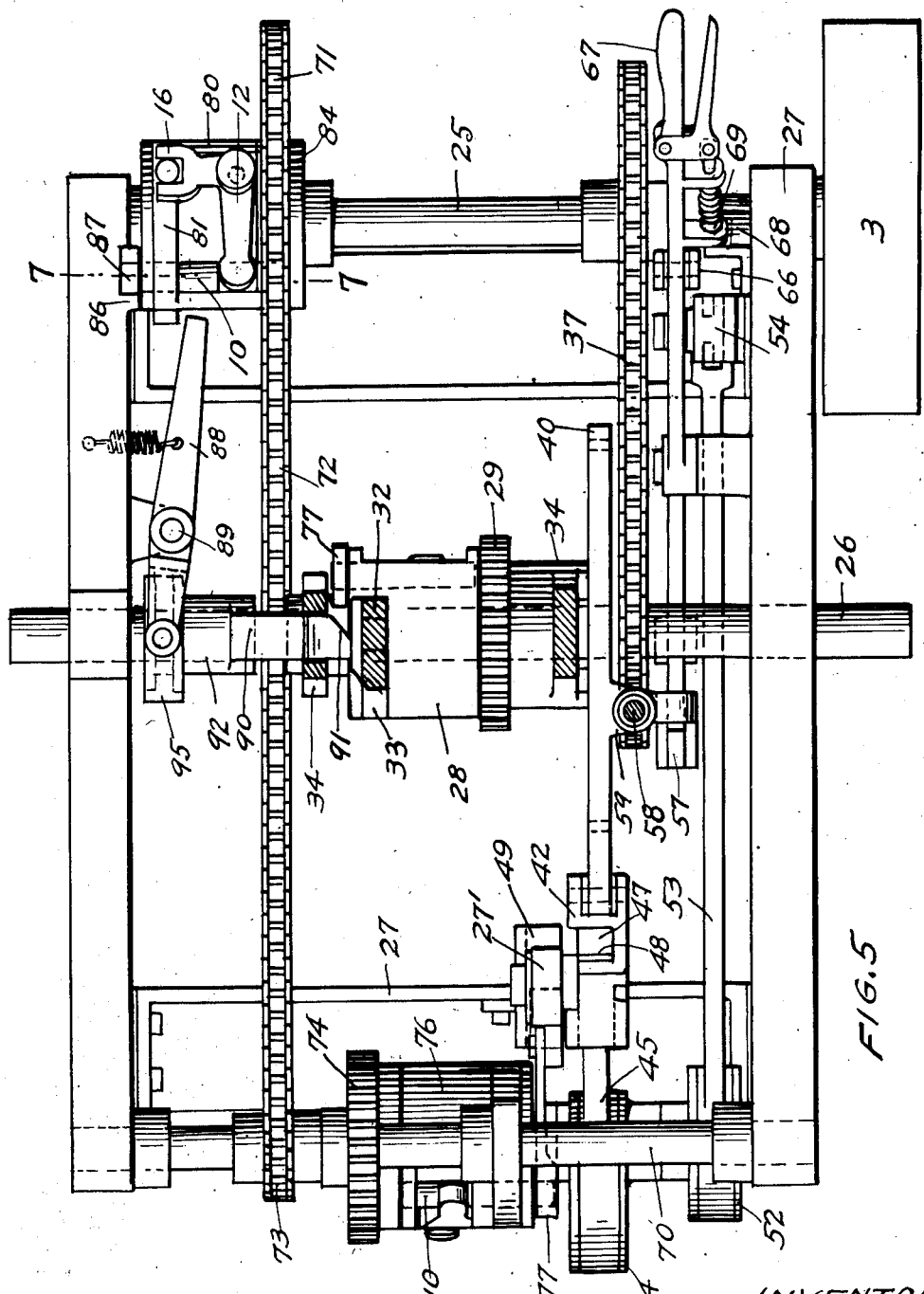

The invention consists more particularly in certain combinations and constructions described in the following specification and shown in the accompanying drawings:

Figure 1 is a plan view of the device in its simplest form, consisting of a single clutch gearing unit, Fig. 2 is a sectional view on the line 2—2 of Fig. 1, Fig. 3 is a sectional view on the line 3—3 of Fig. 1, Fig. 4 is a side elevation, partly in section, of a mechanism for producing a number of adjustable motion and rest periods in fractional and whole revolutions of the driven shaft, Fig. 5 is a plan view of Fig. 4, partly in section, Fig. 6 is a vertical transverse section on the line 6—6 of Fig. 4, Fig. 7 is a section on the line 7—7 of Fig. 5, Fig. 8 is a section on the line 8—8 of Fig. 7, Fig. 9 is a section on the line 9—9 of Fig. 6, Fig. 10 is a section on the line 10—10 of Fig. 4, Fig. 11 is a section on the line 11—11 of Fig. 4, Fig. 12 is a section on the line 12—12 of Fig. 4, Fig. 13 is a section on the line 13—13 of Fig. 14 and shows a modified construction for obtaining, in two shafts driven from the same source, alternate periods of motion and rest so that when one shaft is in motion the other is at rest, Fig. 14 is a section on the line 14—14 of Fig. 13, Fig. 15 is a section on the line 15—15 of Fig. 13, Fig. 16 is a section on the line 16—16 of Fig. 13, Fig. 17 is a section on the line 17—17 of Fig. 13.

Referring to Figs. 1, 2 and 3 showing the simple form of the device, 2 represents the motive or driving shaft, which may derive continuous motion in any convenient manner, as by a pulley 3. It is mounted in bearings in a frame 4. A gear 5 and a cam arm 6 are secured to the shaft 2 and the gear 5 meshes with and imparts continuous rotary movement to a gear 7 that is mounted loosely upon a shaft 8. To this shaft 8 is imparted intermittent movement, the motion periods of which may be varied by changing the ratio of the gears 5 and 7 and the stop periods by the same and other means, which will appear hereinafter. An annular clutch body 9 is secured to the shaft 8 adjacent to the gear 7 and is provided with a clutch member or pin 10 that is adapted to periodically enter a slot or hole 10' in the gear 7 and thus lock the clutch body 9 and gear 7 together. The clutch pin 10 slides in a suitable aperture in the clutch body 9 parallel with the shaft 8, and is actuated by the bell crank lever 12. This lever is pivoted to the clutch body at 13, and it is engaged with the arm 14 in a shouldered slot 15 in the clutch pin 10 and with the other forked arm 16 it is connected to a pivoted releasing dog 17. The pivot 18 of the dog 17 is in a plane at right angles to the pivot 13 of the bell crank lever 12.

The dog 17 is mounted in a slotted recess in the clutch body 9 and contours its circomference when in a compressed position. A tension spring 19 tends to push the projection 20 of the dog 17 outward from the center, thus exerting pressure through the bell crank lever 12 on the clutch pin 10 and forcing it toward the gear 7. At the stop periods the clutch pin 10 is held away from the gear 7 by the cam arm 6 engaging the projection 20 of the dog 17. In this position the pin projects beyond the end of the clutch body 9 in a position to enter into a locking recess in a stationary lug 21. In operation, this simple form releases the clutch and stops the shaft 8 after each single revolution by means of the cam arm 6 engaging and depressing the dog 17. As the gears 5 and 7 continually revolve the cam arm 6 is removed from the dog 17 and the spring 19 forces the clutch pin 10 against the side of the revolving gear 7 in a position to enter a slot or hole in the gear 11. Assuming, as shown in the drawing, the ratio of the gears to be twenty-four to twenty-eight teeth, the cam shaft gear being four teeth larger than the clutch shaft gear, the pause period will be four teeth or one-seventh of one revolution of the cam shaft, after which a full revolution of the clutch shaft is effected by the remaining twenty-four teeth of the cam shaft gear, thus again bringing the clutch and cam arm in proper alinement for operation. It thus follows that the stop period is equal to the difference in the circumferences of the gears, measured in degrees and that a series of clutch holes, spaced apart a distance equal in degrees to this difference, would have to be provided. By substituting gears of different ratios, and by changing the distance in degrees of the clutch holes accordingly, a period of pauses relative to the periods of motion would be altered. Instead of changing or closing the clutch holes the cam may be lengthened or shortened in point of degrees to obtain the same result.

By providing another shaft 22 as the driving shaft, as indicated in Fig. 3, and by changing the gears to various other ratios, a great variety of differing motion and rest periods may be obtained. With a single cam shaft and a single clutch it is obvious that one or more complete revolutions of the clutch shaft must always take place. If, however, two or more cam shafts are provided spaced around the clutch shaft, fractional or whole revolutions or combinations thereof may be obtained.

An example of the great numbers of different combinations of motion and rest periods that may be made very simply with a clutch shaft and a cam shaft for operating the clutch, running at different speed, is illustrated by the shafts 43 and 70 in Figs. 4, 5 and 8, where the gear ratio is 6 to 7 and the number of clutch holes in clutch gear is one. The projecting face 83 of the cam 82 is prolonged to hold the clutch out of engagement with the gear for four revolutions of the clutch shaft, after which the cut away part of the cam permits the clutch pin to enter the gear and revolve the clutch shaft for two revolutions, when the initial position of the clutch and cam is restored and the clutch is released for four revolutions of the shaft.

To obtain quickly adjustable periods of motion and pauses in fractional revolutions plus or minus one or more revolutions of the driven shaft, I provide mechanism for rotating the cam shaft in either direction in intermittent movements of adjustable lengths around the driven shaft and combining these movements with some form of the gear ratios and cam shape described above. In Figs. 4 to 12 is shown such a mechanism.

The driving shaft 25 and driven shaft 26 are mounted in bearings in a frame 27 and the driven shaft 26 is provided with an intermittent clutch gear similar in all essential respects to the gear heretofore described and consisting of the clutch 28 secured to the shaft 26, the orbit gear 29 loosely mounted on said shaft, planetary gear 30 secured to the cam shaft 31 and the cam arm 32 also secured to said shaft and adapted to operate the clutch dog 33. The cam shaft 31 is mounted in a rotatable frame 34 that is mounted to rotate around the shaft 26. The hub 35 of the gear 29 extends through the frame 34 and is at its outer end secured to a sprocket 36. A chain 37 drives the sprocket 36 from a sprocket 38 secured on the driving shaft 25. The shaft 26 is driven intermittently at periods determined by the gear ratio and the cam arm 32, and at intervals the frame 34 is rotated in either one or the other direction during a period of motion of the shaft 26. To accomplish this the frame 34 is provided with a toothed wheel or ratchet 39 rigidly secured thereto as by rivets 39', as shown in Fig. 6. Toothed pawls 40 and 41 are adapted to alternately engage the ratchet 39 and are pivoted to an actuating rocker arm 42, which is periodically operated from a clutch shaft 43 by means of an eccentric 44 and strap 45. The rocker arm 42 rocks on a pivot-stud 46 that is adjustably secured to the frame piece 27' in a slot 46' by means of which the stroke of the pawls 40 and 41 may be varied.

A slot 47 is provided in the rocker arm 42 in which the bearing block 48 for the pivot bolt 46 is slidable. Suitable graduating lines 27 are provided upon the frame piece 27' by means of which the stroke of the pawls may be accurately adjusted.

The lower end of the rocker arm is pivotally connected to the eccentric strap 45 and a slotted guide block 49 is arranged upon the frame piece 27' in which preferably a roller 50 upon the pin 51 reciprocates. The pawls 40 and 41, when periodically operated, are thrown in and out of engagement with the ratchet wheel 39, as shown in Fig. 6, by means of an eccentric 52 upon the shaft 43, connecting strap 53, rocker arm 54, link 55, bell crank lever 56, link 57 and guide bar 58. Lugs 59 are provided on the pawls 40 and 41 through which the guide bar is adapted to slide and shoulders 60 arranged upon the bar 56 are adapted to engage the lugs 59 and throw the pawls out of engagement with the ratchet 39. Tension springs 61 secured by adjusting nuts 62 tend to force the pawls against the shoulders 60 of the guide bar 58. The adjustment of the eccentrics 44 and 52 upon the shaft 43 is such that when the pawls 40 and 41 are operated through the mechanism above described, one pawl engages the ratchet on the forward stroke of the eccentric 52 and the other pawl on the reverse stroke and during the shifting one pawl invariably engages the ratchet before the other is disengaged, so that at no period is the ratchet wheel uncontrolled. For reversing the direction of rotation of the frame 34, the rocker arm 54 is provided with a slot 63 extending an equal distance on either side of the stationary pivot 64. The connecting pivot 65 of the link 55 and rocker arm 54 is movable in this slot and held in position on either side of the center of the rocker arm by means of a connecting link 66, operating lever 67, notched quadrant 68 and locking bolt 69. Accordingly, as the link 55 is connected to either end of the rocker arm 54 a different pawl will engage the ratchet during the same stroke of the eccentric 44 and the rotation of the ratchet will be reversed.

Referring to Figs. 1, 4, 5 and 8, the cam shaft 70 controlling the clutch shaft 43 is driven from the main driving shaft 25 by means of sprocket wheel 71, chain 72 and small sprocket 73. A gear 74 on the cam shaft 70 meshes with a clutch gear 75 loosely mounted upon the shaft 43. A clutch 76 similar in construction to the clutch described in Figs. 1, 2 and 3 is fastened to the shaft 43. A stationary but laterally yielding arm 77 projects from the frame piece 27, and a hole 78 in the arm 77 is in a position to be entered by the clutch pin 10, the arm 77 thus forming a positive lock for the clutch shaft 43. The gear ratio and cam face construction, as heretofore described, causes two consecutive revolutions of the clutch shaft and thereafter a pause equal to four revolutions of the shaft.

During the two revolutions, both the driven shaft and the frame 34 are rotated and during the pause of the clutch shaft the driven shaft is at rest for a period of one of its revolutions. As the gear ratio is herein shown, this rest is always for a period of one revolution of the driven shaft corresponding to four revolutions of the clutch shaft and the main driving shaft 25 makes one revolution to six revolutions of the clutch shaft. During these six revolutions the pause and rotation of the driven shaft 26 must take place. As both the driven shaft and clutch shaft are driven at fixed ratios from the main driving shaft and as the time periods of the driven shaft are subject to variation while the periods of the clutch shaft are constant, it is evident that unless otherwise compensated for, the relative sequence of movement and pauses of the two shafts would be interrupted by reason of these variations.

To compensate for these adjustable variations of the shaft 26 and maintain the proper sequence of movements, a controlling clutch 80 (see Figs. 5 and 7) is provided upon the main driving shaft 25. The sprocket wheel 71 is secured to the clutch 80 and a clutch disk 84 in which a series of clutch holes 85 is arranged is secured to and turns with the driving shaft 25. A stationary stop lug 86 is provided on the frame 27 and has preferably a slot 87 into which the clutch pin 10 periodically enters. A shifting lever 88 is pivoted at 89 upon the frame 27 and is adapted to engage the clutch dog 81 when the clutch is rotated and throw the clutch pin 10 out of engagement with the disk 84 and into the slot 87. The arm 88 is operated by the cam arm 32 upon the cam shaft 31 by means of an arm 90 engaging a beveled cam face 91 upon the cam arm 32 and extending through a slot 90' in the frame 34, being connected to a sleeve 92 slidably mounted upon the shaft 26. An annular groove 93 is provided in the sleeve 92 in which the forked end 94 of the shifting lever 88 is engaged preferably through a strap 95.

In operation, when the shaft 26 has completed it motion, and the cam arm 32 releases the clutch 28 from the orbit gear 29, the shifting lever 88 is simultaneously released from the clutch dog 81, the clutch pin 10 enters a hole in the clutch disk 84 and the clutch gear 75 upon the shaft 43 starts rotating, driven by the sprockets 71 and 73, the chain 72 and gears 74 and 75.

As the driven shaft 26 is locked to the frame 34 during the pauses and is engaged by the orbit gear 29 when released from the frame, the frame movement must be completed before the clutch, by its rotation, again is in position to lock itself to the frame. As the orbit and planetary gear ratio is shown to be two to one, the shaft 26 would normally rotate one complete revolution relative to the frame 34 before coming to a stop for the period of another revolution. If, however, the frame 34 with planetary cam shaft is advanced in the direction of rotation of the shaft 26, this advance is added to the one rotation of the shaft and if the frame is moved in a reverse direction to the shaft, the degree of movement is subtracted from one complete revolution. It is evident, therefore, that during two revolutions of the clutch shaft 43 the driven shaft 26 may be caused to make any predetermined part of one revolution plus or minus one complete revolution.

When the driving shaft has made one complete revolution corresponding to six revolutions of the clutch gear 75, the shifting lever 88 has been released from the cam arm 32 and thrown back in the path of the clutch dog 81 by a spring 81' to again disengage the clutch and stop the clutch gear 75. If, however, the frame 34 has been turned backward one-half a revolution, the shifting lever 88 will be removed from this position by the cam arm 32 just in time to avoid disengaging the clutch and the rotation of the clutch gear 75 will be continuous. This would result in a movement of the driven shaft 26 of one-half revolution and a period of one revolution of rest. If the throw of the pawls 40 and 41 is reduced to zero, the frame 34 would not be turned at all and the result would be one revolution of the driven shaft and a rest period of one revolution. The clutch would be thrown out of connection for one-third revolution of the driving shaft, stopping the clutch gear 75 for that period or two revolutions. If the parts are adjusted to turn the frame 34 one-half revolution ahead the result would be 1½ revolutions of the driven shaft and a pause for a period of one revolution. The clutch would be released for ⅔ revolution of the driving shaft, stopping the clutch gear 75 four revolutions. These are a few of the different fractional revolutions and constant stops that can be accomplished with certain ratios of gearing and faces of cams.

In many classes of machinery it is necessary to operate certain parts of a machine while other parts are at rest and to alternate the periods of motion and rest of the respective parts. In Figs. 13 to 17 I have shown means as applied to the clutch shaft 43 for obtaining this result, although it must be understood that substantially the same means may be applied to the shaft 26.

An additional clutch 96 is loosely mounted upon the shaft 43 and abutting the opposite side of the loose running gear 75. A second cam 97 is arranged upon the cam shaft 70 and is adapted to control the operation of the clutch 96. The projecting face 98 of the cam 97 is arranged opposite the projecting face 83 of the cam 82 with respect to the cam shaft and is nearly equal in degrees to the cut away portion of the cam 82, as shown in Figs. 14, 16 and 17. The result of this construction is that when either one of the clutch dogs 17 are released the other is engaged by a cam face and that therefore when one clutch pin 10 is connected to the revolving clutch gear 75 the other pin is disconnected from the gear and in engagement with its stationary lock. A single clutch hole 10' for each clutch pin is required with this construction. During the pause of the shaft 43 the clutch 96 and gear 75 are thus revolving together loosely upon the shaft 43 and when the shaft 43 is rotated to operate the eccentrics 44 and 52 and the frame 34 the clutch 96 is at rest. At the gear ratio shown, out of six revolutions of the gear 75 the shaft 43 will revolve two consecutive revolutions and pause for four revolutions. During the two revolutions of the shaft 43, the clutch 96 will pause, and during the following four revolutions of the gear 75, the shaft 43 will pause and the clutch 96 revolve. I prefer to transmit the motion and pause periods of the clutch 96 to a secondary shaft 99 mounted in bearings in the frame 27 and provided with a gear 100 in mesh with a gear 101 secured to the clutch 96. The gears 100 and 101 may be of any preferred ratio, commensurate with the work required.

It is understood that various other combinations of motion and rest periods may be accomplished with the same gear ratio and that by changing to different gear ratios and cam faces a great variety of intermittent motion may be obtained. The number and position of holes in the clutch disk would, of course, be arranged to correspond to any desired fractional revolution.

Although I have shown only one form of clutch as preferable, I do not want to confine the invention to this form, as other forms may be easily substituted with this gearing. Various other modifications may be made in the details of construction without departing from the spirit of the invention and I do not, therefore, wish to limit myself to the particular construction shown.

I claim as my invention:

1. An intermittent gear mechanism comprising a constantly rotating clutch member and an intermittently rotatable clutch member, a clutch element for periodically effecting driving connections and intermissions of connection between said clutch members, and rotating means controlling said driving clutch element and operating synchronously with said rotating clutch member.

2. An intermittent gear mechanism comprising a constantly rotating clutch member and an intermittently rotatable clutch member, a clutch element for periodically effecting driving connections and intermissions between said clutch members and a rotatable cam controlling said clutch element and rotating synchronously with said rotating clutch member.

3. An intermittent gear mechanism comprising a constantly rotating clutch member and an intermittently rotatable clutch member, a clutch element for periodically effecting driving connections and intermissions between said clutch members, a rotatable cam controlling said clutch element and geared means for rotating said first named clutch member and said cam constantly and at predetermined ratios of speed.

4. An intermittent gear mechanism comprising a constantly rotating clutch member and an intermittently rotatable clutch member, a clutch element for periodically effecting driving connections and intermissions between said clutch members, a rotatable cam controlling said clutch element, geared means for rotating said first named clutch member and said cam at a constant predetermined speed ratio, and said cam having an operating face proportionate in degrees of circumference to said speed ratio and to the duration of the clutch connections and intermissions.

5. An intermittent gear mechanism comprising a constantly rotating clutch member and an intermittently rotatable clutch member, a clutch element for periodically effecting driving connections between said clutch members at varying points of the circle, a rotatable cam controlling said clutch element and said connections, geared means for rotating said first named clutch member and said cam at constant predetermined speed ratios, and said cam having an operating face proportionate in degrees of circumference to said speed ratio and to the varying points of clutch connections and intermissions.

6. In an intermittent gear mechanism, the combination, of a constantly rotating clutch member, an intermittently rotatable clutch member and a clutch element periodically operating to effect driving connections and intermissions between said clutch members, with means for controlling the operation of said clutch element, said means rotating synchronously with said rotating clutch member, a second set of constantly and intermittently rotating clutch members having controlling means for periodically effecting driving connections and intermissions between said clutch members and means connected to the first named intermittently rotating clutch member for varying, as to time and duration, the periodical connections and intermissions of the last named clutch members.

7. In an intermittent gear mechanism, the combination, of a constantly rotating clutch member, an intermittently rotatable clutch member and a clutch element periodically operating to effect driving connections and intermissions between said clutch members, with means for controlling the operation of said clutch element, said means rotating synchronously with said rotating clutch member, a second set of constantly and intermittently rotating clutch members having controlling means for periodically effecting driving connections and intermissions between said clutch members and means connected to said first named intermittently rotating clutch member for varying, as to time and duration, the periodical connections and intermissions of the last named clutch members, a third set of clutch members, one of said third members rotating synchronously with the constantly rotating clutch members of said first and second set, a clutch element for periodically effecting driving connections between said third set of clutch members, and means connected to the controlling means of the second set of clutch members for controlling the rotation of the first named rotating clutch member.

8. In an intermittent gear mechanism, the combination, of a constantly rotating clutch member, an intermittently rotatable clutch member and a clutch element periodically operating to effect driving connections and intermissions between said clutch members, with means for controlling the operation of the clutch element, said means rotating synchronously with said rotating clutch member, a second intermittent clutch member, a second clutch element operating to effect driving connections and intermissions with said constantly rotating clutch member, a controlling means for said second clutch element, said controlling means coöperating with the first named controlling means to alternately connect the said clutches to said rotating clutch members.

9. In an intermittent gear mechanism, the combination, with a constantly running driving shaft and an intermittent mechanism including a clutch element operated from said shaft, of a constantly rotating clutch member, an intermittently rotatable clutch member, a clutch element operating to periodically connect said clutch members, a cam member for controlling the operation of said clutch element and means connected to said intermittent operating mechanism for automatically adjusting said cam member to advance or retard the operation of the clutch during the rotation of said clutch member.

10. The combination, of a constantly rotating clutch member and an intermittently rotatable clutch member, with a clutch element periodically effecting driving connections and intermissions between said clutch members, means for controlling said clutch element, said means rotating synchronously with said rotating clutch member and a stationary locking member for said intermittently rotating clutch member operative only when said clutch member is at rest.

11. The combination, of a constantly rotating clutch member and an intermittently rotating clutch member, with a clutch element periodically effecting driving connections and intermissions between said clutch members, means for controlling the operation of said clutch element, said means rotating synchronously with said rotating clutch member, a stationary clutch member, and means for engaging said clutch element and positively locking said intermittent clutch member to said stationary member during the periods of intermission.

12. An intermittent gear mechanism comprising a constantly rotating clutch member, an intermittently rotatable clutch member, a clutch element for periodically connecting and disconnecting said clutch members, means for periodically preventing connection between said clutch members, and means for controlling the periods of connecting and disconnecting.

13. An intermittent gear mechanism comprising a constantly rotating clutch member, an intermittently rotatable clutch member, a clutch element for periodically connecting and disconnecting said clutch members, means for periodically preventing connection between said clutch members, and means for controlling the periods of connecting and disconnecting, said means rotating in unison with said clutch members.

14. An intermittent gear mechanism comprising a constantly rotating clutch member and an intermittently rotatable clutch member, a clutch element for periodically effecting a driving connection between said clutch members and means controlling the operation of said clutch, said means rotating on a center that is movable around said clutch element and clutch members.

15. An intermittent gear mechanism comprising a constantly rotating clutch member and an intermittently rotatable clutch member, a clutch element for periodically making a driving connection between said clutch members, a rotating element for controlling the periodical operation of said clutch element, and means for intermittently moving said rotating element in a circular path around said clutch members.

16. The combination, with a rotating clutch, of rotating means for actuating said clutch at predetermined intervals, and mechanisms for varying the periods of operation of said clutch.

17. The combination, with a rotating clutch, of rotating means for operating said clutch at predetermined intervals, and mechanism for adjusting said operating means to vary the interval between the periods of operation of said clutch.

In witness whereof I have hereunto set my hand this 13th day of November, 1918.

ARTHUR W. HARRIS.